United States Patent
Lu et al.

(10) Patent No.: US 7,249,165 B1
(45) Date of Patent: Jul. 24, 2007

(54) METHOD AND SYSTEM FOR MESSAGE INITIATION OF DIGITAL VIDEO RECORDERS PEER-TO-PEER VIDEO/MEDIA FILE DELIVERY

(75) Inventors: Bin Lu, Stanford, CA (US); Hongyu Chi, Sunnyvale, CA (US); Xiang Jun Wang, San Jose, CA (US)

(73) Assignee: EnReach Technology, Inc., Santa Clara, CA (US)

( * ) Notice: Subject to any disclaimer, the term of this patent is extended or adjusted under 35 U.S.C. 154(b) by 760 days.

(21) Appl. No.: 09/919,412

(22) Filed: Jul. 30, 2001

(51) Int. Cl.
*G06F 15/16* (2006.01)
(52) U.S. Cl. ................................. 709/217; 709/206
(58) Field of Classification Search ............ 709/206, 709/217–219
See application file for complete search history.

(56) References Cited

U.S. PATENT DOCUMENTS

| | | | | |
|---|---|---|---|---|
| 5,771,355 A * | 6/1998 | Kuzma | ........................ | 709/232 |
| 5,802,314 A * | 9/1998 | Tullis et al. | ................. | 709/246 |
| 5,855,020 A * | 12/1998 | Kirsch | ........................ | 707/10 |
| 5,860,068 A * | 1/1999 | Cook | ........................ | 705/26 |
| 5,903,723 A * | 5/1999 | Beck et al. | ................. | 709/200 |
| 5,903,892 A * | 5/1999 | Hoffert et al. | ................. | 707/10 |
| 5,956,716 A * | 9/1999 | Kenner et al. | ................. | 707/10 |
| 5,960,403 A * | 9/1999 | Brown | ........................ | 705/2 |
| 5,978,836 A * | 11/1999 | Ouchi | ........................ | 709/206 |
| 6,014,689 A * | 1/2000 | Budge et al. | ................. | 709/206 |
| 6,295,058 B1 * | 9/2001 | Hsu et al. | ..................... | 715/769 |
| 6,360,252 B1 * | 3/2002 | Rudy et al. | .................. | 709/206 |
| 6,457,879 B1 * | 10/2002 | Thurlow et al. | ............. | 709/206 |
| 2002/0138641 A1 * | 9/2002 | Taylor et al. | ................ | 709/231 |
| 2002/0143886 A1 * | 10/2002 | Camens | ......................... | 709/208 |
| 2002/0143918 A1 * | 10/2002 | Soles et al. | .................. | 709/223 |
| 2003/0046697 A1 * | 3/2003 | Shinohara | ..................... | 725/51 |

OTHER PUBLICATIONS

Secure External References in Multimedia Email Messages, Wiegel, EB., ACM 0-89791-859, 1996, p. 11-18.*
Secure External References in Multimedia Email Messages, Wiegel, EB., ACM 0-89791-859, 1996, p. 1-8.*
Visual Preview for Link Traversal on the WWW, Kopetzky, T. et. al., Proceedings of the 8th Conf. on the WWW, 1999, Elsevier North-Holland, Inc., ISSN: 1389-1286, p. 1525-1532.*

(Continued)

*Primary Examiner*—Beatriz Prieto

(57) ABSTRACT

In one embodiment of the invention, a sender client provides to a server a message giving the location of one or more potentially large media files, such as video clips. The server relays this location message to each recipient. A receiver client, in response to the location message, accesses or makes a local copy of the media file from either the sender client or another peer client that is also a receiver of the message. The sender and receiver clients may be personal video recorders (PVRs), personal computers, workstations, video camcorders or personal digital assistants. The server may be, for example, a PVR, a personal computer, a workstation, and an application service provider. The server may be accessed via the Internet. The location message can include information about the media file clip it contains, such as its title, date/time stamp, copyright indication or one or more text fields.

40 Claims, 6 Drawing Sheets

OTHER PUBLICATIONS

Enriched Links: A framework from Improvinf Web Navigation using Pop-Up Views, Geisler, G. (2000), SILS Technical Report TR-2000-02, p. 1-14.*

A concept for an Electronic Magazine, Alexander von Berg, et. al., TERENA=NORDUnet Networking Conference (TNNC) 1999, p. 1-8.*

Programming Environment, Industry Report, Gong, Li, Sun Microsystems Inc., IEEE Internet Computing, May-Jun. 2001, ISBN 1089-801/01, p. 88-95.*

Microsoft Press: Computer Dictionary, 3rd Ed. c1997, the term: "video" on p. 495.*

Kohtake, N., et al. InfoStick: An Interation Device for Inter-appliance Computing, HUC'99, LNCS 1707, 1999, p. 246-258.*

InfoPoint: A device that provides a Uniform User Interface to Allow Appliances to work together over a network, Kohtake, N., et. al., Springer-Verlag, Personal & Ubiquitous Computing, 2001, p. 264-274.*

* cited by examiner

METHOD AND SYSTEM FOR MESSAGE INITIATION OF DIGITAL VIDEO RECORDERS PEER-TO-PEER VIDEO/MEDIA FILE DELIVERY

TECHNICAL FIELD

The present invention relates to the field of digital media such as audio/video clips and the field of electronic mail (e-mail). More specifically, the present invention relates to the delivery via a server of an electronic mail message that initiates transfer of potentially large size media files on a peer-to-peer basis without making an intermediate copy on a server of the media files.

BACKGROUND ART

Modern research and technology have provided society with a wide variety of electronic devices. Some of these modern electronic devices are very powerful and useful to their users. For example, modern video cameras and video camera/recorders (camcorders) have made it possible for many people to routinely see and hear both live and recorded audio video segments or clips. Furthermore, electronic mail (e-mail) allows fast and easy personal communications among friends and families, as well as practical communication within and among businesses. Part of what makes e-mail effective is that unlike a live phone call or an on-line chat, the sender and recipient need not be on line simultaneously to communicate; thus, their schedules need not be coordinated, and the sender need not interrupt the recipient as happens in a live phone call.

Along with the ability to record an audio/video clip, for example, of young children playing with a new toy, comes the desire to share the clip with another person, perhaps at a distance. Today's dominant form of sharing recorded audio/video clips relies on letters and packages that are physically delivered. Nevertheless, today's Internet and e-mail connected world makes physical delivery seem slow and cumbersome; a video tape or disk must be written or copied, packaged, addressed and shipped. Of course, there is often a significant wait for it to be physically delivered.

While attaching an audio/video clip to an electronic mail message is done today, it is not commonplace. This is partly because of the potentially very large size of audio/video clips, depending on the duration of the clip, its image size and its image quality.

Further, the mechanisms used for routing and delivery of relatively small size electronic text messages are not well suited for routing and delivery of relatively large size media such as audio/video clips. For example, it is common for delivery of an e-mail message to require that at least three copies of the message exist: one on the client that originated the e-mail, one on the mail server, and one on the client for which the e-mail message is destined. The server copy may be deleted after successful delivery, but it must exist as a full copy of the message during the delivery process, which may take days or longer if problems are encountered (such as a server or client being down or temporarily unavailable).

Further, it is common for there to be multiple mail servers between the sender client and the receiver client, perhaps one linked to each client by a local area network, with the two mail servers being linked by the Internet or by a wide area network. Each intermediate server requires its own full copy of the e-mail message, at least during the period of time that the e-mail message is in the process of being delivered to and from each server. These intermediate copies occupy digital storage space, and they require server time and bandwidth to read, to write and to delete when no longer needed.

SUMMARY OF THE INVENTION

Accordingly, a need exists for a system and method for delivering media via a peer-to-peer connection—one that does not place, even temporarily, a copy of the media file on an intermediate server.

According to an embodiment of the invention, a sender client provides to a server a location message that includes a handle for a media file. For each recipient, the server passes the location message on to a receiver client associated with that recipient. In some cases, there is an active connection between the server and the receiver client when the location message is received at the server and the location message can be relayed with minimal delay. In other cases, the server keeps checking for the presence of an active connection until the receiver client comes on line. In yet other cases, the receiver client notifies the server when it is connected and able to receive location messages.

In response the location message, the receiver client accesses the media file, which may include but is not limited to making a local copy of it. The access or copying occurs from either the sender client or from another client that is also a receiver for the message.

The sender and receiver clients can include but are not limited to: personal video recorders (PVRs), personal computers (PCs) including those like the Macintosh® series by Apple Computer, Inc., workstations, video camcorders or personal digital assistants (PDAs). The server can be but is not limited to: a personal video recorder, a personal computer, a workstation, and an application service provider. The server may also be accessed via the Internet.

In some embodiments of the invention, the location message can include information about the media file, including but not limited to a title of the media file, a date stamp of the media file, a time stamp of the media file, a copyright indication for the media file, a preview of the media file, or one or more text fields.

The recipient addresses can be in a form including but are not limited to: user identifiers (ID) on their servers and the servers Internet domain names, Internet Protocol (IP) addresses, e-mail addresses, user identifiers (ID) within local networks or device identifiers (IDs) within local networks. In some embodiments of the invention, a Domain Name System (DNS) server is used to resolve recipient addresses.

The audio/video clip within the media file is stored or transferred in a format including but not limited to MPEG-2, a format compatible with one of the Moving Pictures Experts Group (MPEG) standards, and a format compatible with the MPEG-1 or MPEG-2 audio layer 3 standard (known as MP3).

In some embodiments of the invention, the server checks for the presence of receiver clients and provides to them the location message when the check finds that the receiver client is connected. In other embodiments, the receiver client notifies the server when the receiver client has been newly connected, or the receiver client periodically polls the server to see if there are any new messages for it.

In some embodiments, the receiver client, upon receipt of the location message, checks for a connection to the sender client over which to receive the media file. If none is found, then the receiver client checks for a connection to any peer receiver client that has already made its own local copy of the media file. If one is found, then the receiver client can make its local copy from that peer receiver client rather than waiting until a connection is available to the sender client.

Connections between the sender client and the receiver client, between the sender client and the server, and between the receiver client and the server can include but are not limited to: Internet-based communication channels, communication channels based on the Transmission Control Protocol/Internet Protocol (TCP/IP) and communication channels based on the User Datagram Protocol (UDP).

These and other advantages of the present invention will be apparent to those skilled in the art after reading the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
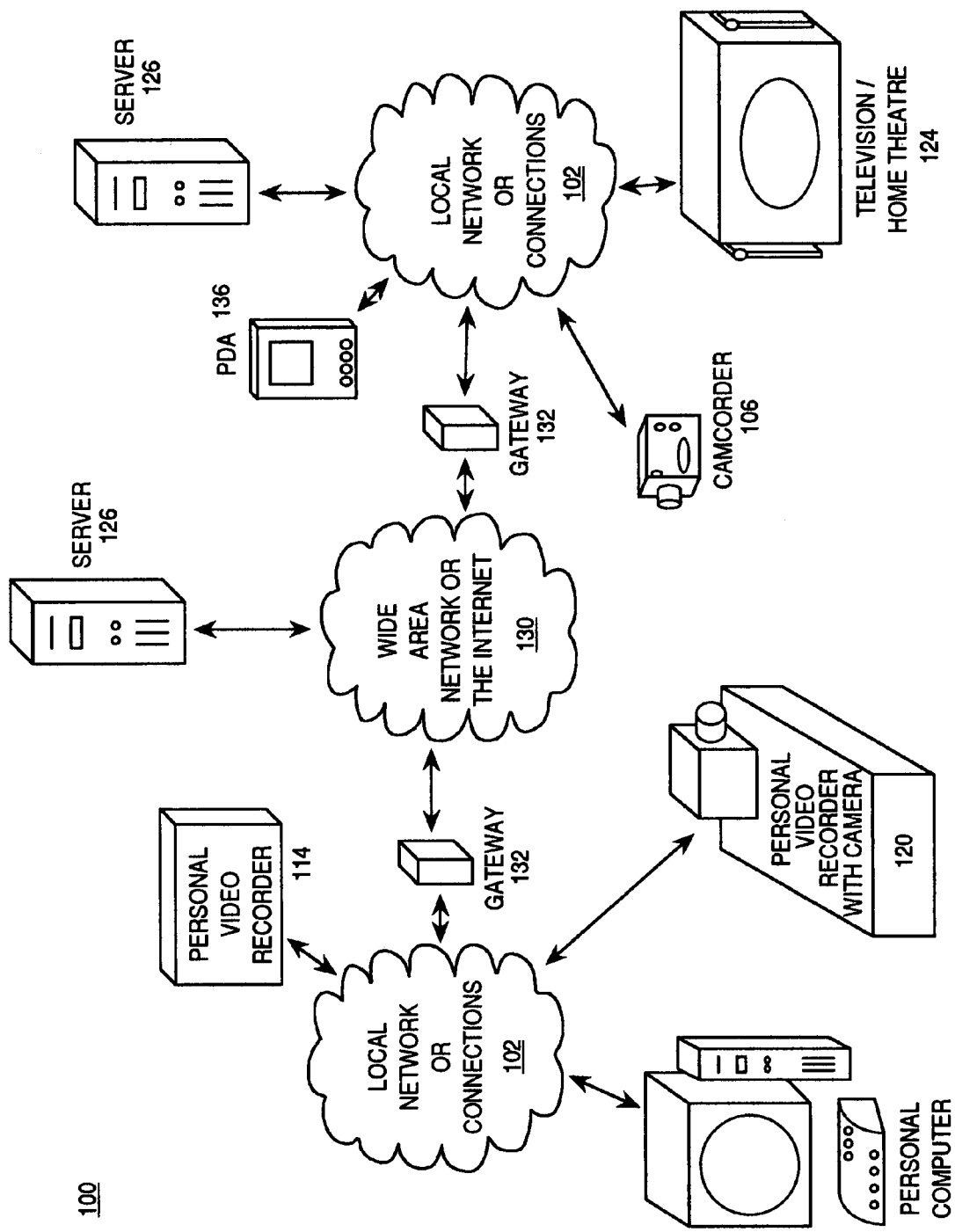
FIG. 1 shows, according to one embodiment of the invention, some typical clients and their interconnections or how they are networked for exchanging media files.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

FIG. 1 is a diagram of a network 100, according to one embodiment of the invention, of clients for exchanging media files. While not all inclusive, FIG. 1 shows that the invention, in its various embodiments, can be used with a wide range of clients serving as the sender of the location message, as its receiver, and as a location message server.

Within the present embodiment of FIG. 1, the clients and servers involved in delivering a location message are linked by local networks or connections 102 and/or via the Internet 130 (which is linked to the clients by gateway 132). Local networks or connections 102 may be uniform (for example, all clients are on the same bus) or heterogeneous (for example, some clients are directly wired to each other while others are only connected via an Ethernet or via a corporate intranet).

Figure 5:
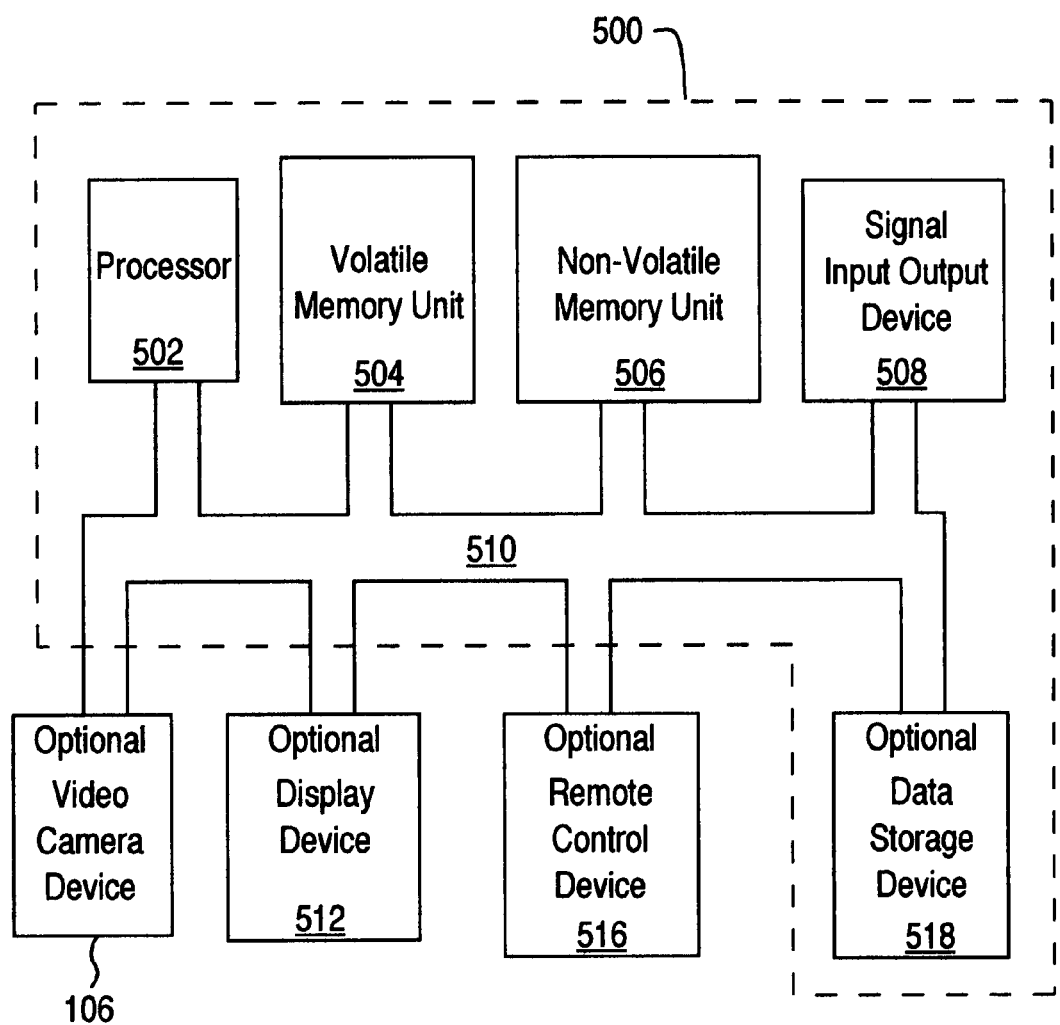
FIG. 5 shows the functional components and their interconnections of a personal video recorder (PVR) used in accordance with one embodiment of the invention.
Figure 6:
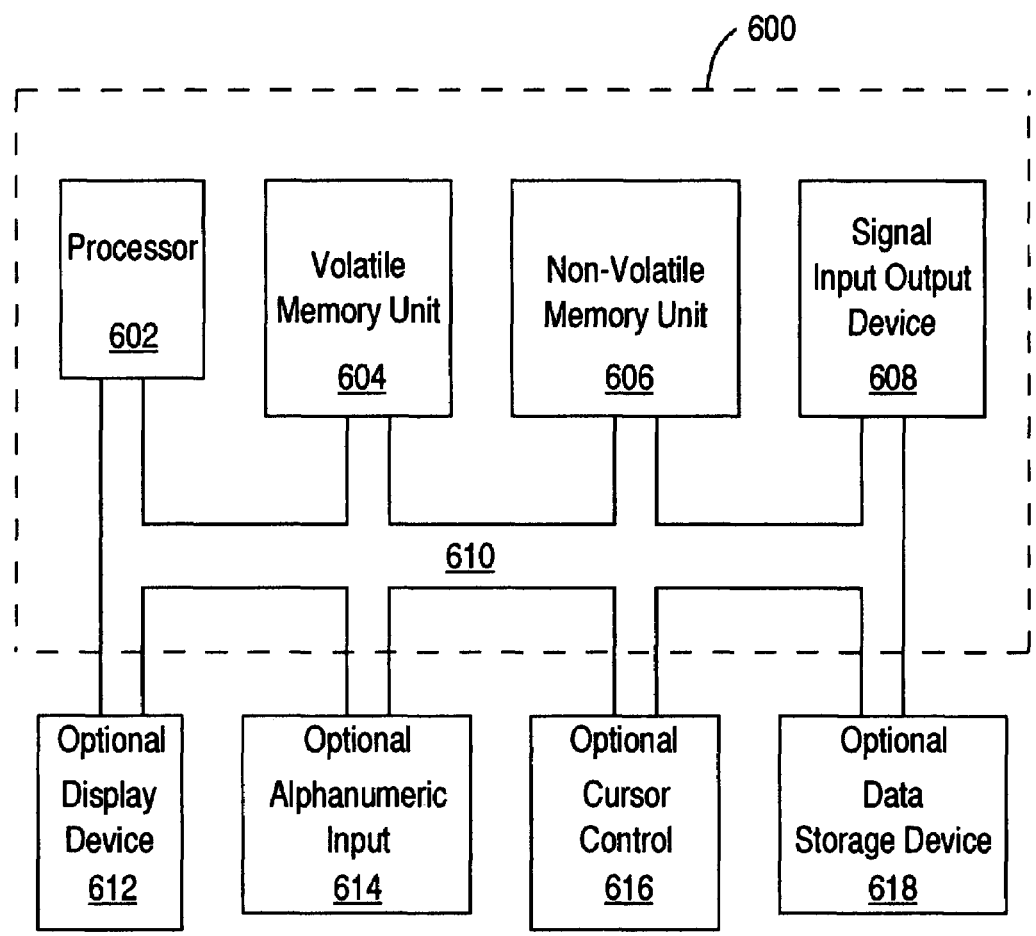
FIG. 6 shows the functional components and their interconnections of a computer system used in accordance with one embodiment of the invention.

Clients that can serve as senders of location messages, as receivers of location messages, or both include but are not limited to: video camera/recorder (camcorder) 106, personal computer 110, personal video recorder 114, personal video recorder with camera 120, television/home theatre 124 and Personal Digital Assistant (PDA) 136. Clients that can serve as media mail servers include but are not limited to: personal computer 110, personal video recorder 114, personal video recorder with camera 120 or media mail server 126. Personal video recorders 114 and 120 may be configured as shown in FIG. 5 with regard to personal video recorder 500. Personal computer 110 and media mail server 126 may be configured as shown in FIG. 6 with regard to personal computer 600.

Figure 2:
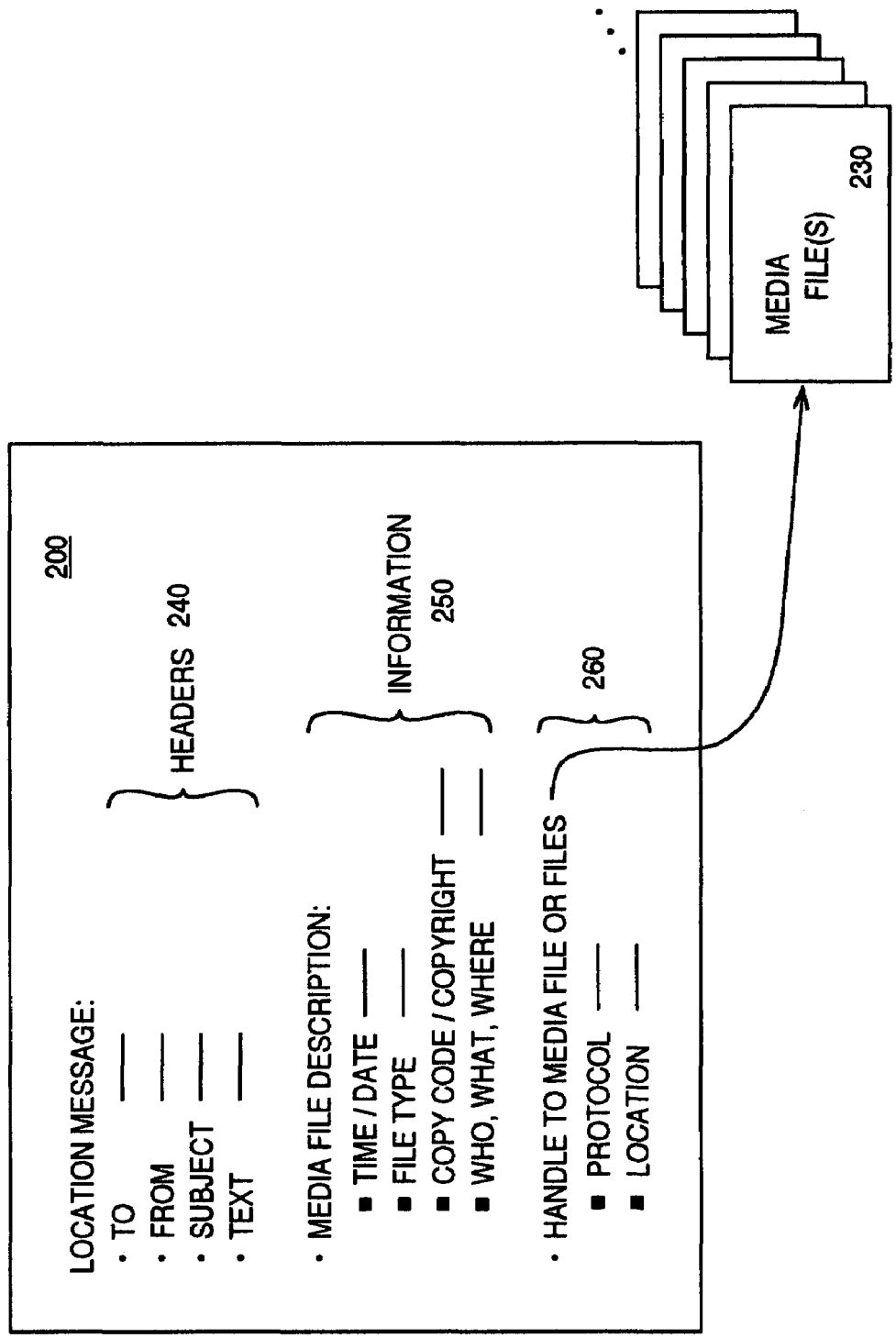
FIG. 2 illustrates the contents of a location message, according to one embodiment of the invention.

FIG. 2 is a figurative data structure diagram of a location message 200, according to one embodiment of the invention. In this embodiment, location message 200 comprises headers 240, descriptive information 250 and handle 260 to media file or files 230. Each media file 230 can include but is not limited to: a video clip, an audio/video clip, a two dimensional image, a three dimensional image, a text document, a data file, an application program or a compressed archive. Descriptive information 250 can include but is not limited to: a title of the media file, a title of the video clip, or of both; a time or date stamp for the media file, for the video clip, or for both; a message from the sender of the media file to its recipient (in the form of text, for example), or information describing the video clip (who, what, when, where or why, for example). Location message 200 may also include a preview of the media file.

Handle 260 is a pointer to, or provides a way to retrieve, media file(s) 230. Handle 260 is sent by the sender client to the receiver client (via the server), and then it is used by the receiver client to request that the media file be sent directly from the sender client to the receiver client. Handle 260 can include but is not limited to: a Universal Resource Locator (URL) or a location of media file 230 and a protocol with which to access it.

Figure 3:
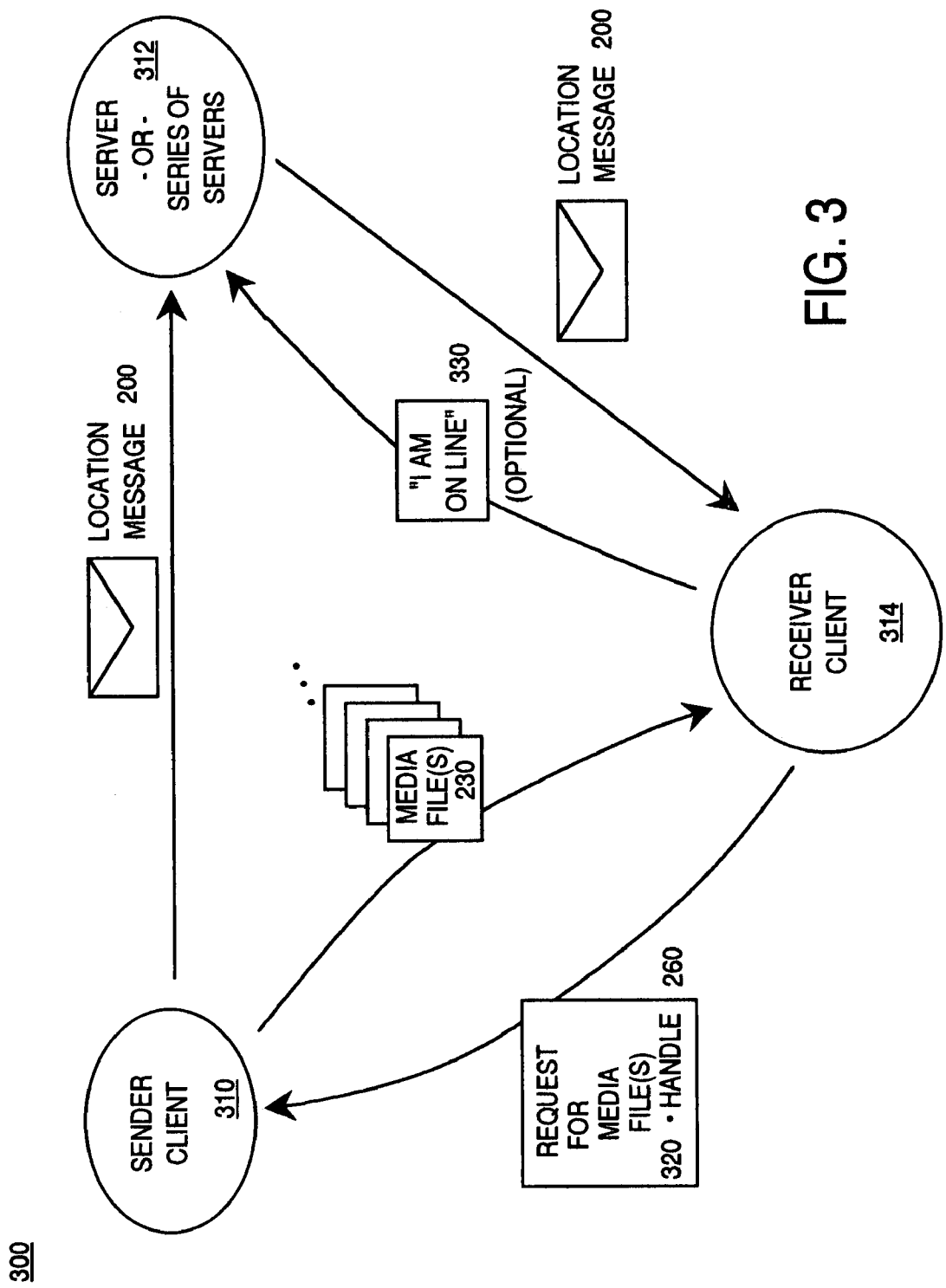
FIG. 3 shows, according to one embodiment of the invention, the information or data utilized to send a location message and how this data flows or is communicated among the server and the two clients involved in the process.

FIG. 3 is a data flow diagram of a process 300, according to one embodiment of the invention, of sending a location message (e.g., 200) and accessing the associated media file or files (e.g., 230). In this embodiment, data flow process 300 involves two clients, specifically sender client 310 and receiver client 314, and a server 312. A client may be an operating system level function or an applications level program. It may run or reside on one or more devices, such as those shown in FIG. 1. Note that sometimes a client will function according to certain protocols as a server; in particular, during peer-to-peer transfers one client may assume the role of the server under the protocol used for the data transfer while the other client assumes the protocol's client role.

Within the present embodiment, a server may be an operating system level function or an applications level program. It may run or reside on one or more devices, such as those shown in FIG. 1. The functions of a server are well known in the art and include but are not limited to: accepting messages from sender clients, storing messages on their way from sender clients to receiver clients, storing clients location information and on line status, storing users location/client information, on line status and personal preferences, and forwarding messages and status information in accordance with system policies and security mechanisms.

Sender client 310 may be the client upon which the media file(s) 230 is originally stored, or the user may compose location message 200 on sender client 310 regarding media file(s) 230 that reside elsewhere. Receiver client 314 may be the client which the recipient of the location message 200 uses to play back or otherwise access media file(s) 230. In the case where the same location message 200 is addressed to recipients that use different receiver clients, there would be multiple receiver clients 314. In other cases, it may be necessary to use a chain of servers 312 in order to communicate location message 200 from sender client 310 to receiver client(s) 314.

In the embodiment of FIG. 3, the first data transfer occurs when sender client 310 sends location message 200 to server 312. The location message 200 is substantially smaller than media file(s) 230. It should be appreciated that it does not matter whether or not receiver client 314 is on line at the time of this first data transfer. Thus, the users of an embodiment of the present invention enjoy the convenience and efficiency of asynchronous communications like e-mail, faxes, or physical letters in that neither the receiver client nor the recipient user need be available or interrupted when the sender composes and sends location message 200. They also enjoy the system efficiencies provided by sending only a short message giving some information about and a handle to media file(s) 230, rather than sending the entire media file(s) 230, which may be very large.

Next in the second data transfer, server 312 sends to receiver client 314 location message 200. Again, the second data transfer is substantially smaller than media file(s) 230. Then in the third data transfer, receiver client 314 sends to sender client 310 a request 320 to send media file(s) 230 which includes handle 260. Again, the third data transfer is substantially smaller than media file(s) 230. Finally in the fourth data transfer, sender client 310 sends media file(s) 230 to receiver client 314. Thus, media file(s) 230, which can be of substantial size, is only transferred once per receiver client 314. It should be understood that the media file(s) 230 may be accessed by the receiver client 314 from the sender client 310 via a method selected from an Internet-based communication method, a communication method based on a Hypertext Transfer Protocol (HTTP) or File Transfer Protocol (FTP).

In some embodiments of the invention, location message 200 is sent from server 312 to receiver client 314 in response to optional message 330 being received at server 312. Optional message 330 is a mechanism for receiver client 314 to inform server 312 that receiver client 314 is on line and available to receive location messages (e.g., 200).

In some embodiments of the invention, users who have accounts with the server (e.g., 312) can set personal preferences. These preferences can include but are not limited to: designating certain video mail senders or sources as producing high priority messages that are to be downloaded first, designating certain video mail senders or sources as producing "junk" mail messages that are to be ignored, setting whether a location message is to be automatically downloaded into a local copy prior to notifying the user that it is available versus asking the user if he or she wants to download each particular message, and so on.

In some embodiments of the invention, security measures such as encryption, keys, authentication certificates, firewalls and challenge and response protocols can be used to protect access to the media file(s) 230 or unauthorized transfer of location messages (e.g., 200). In other embodiments of the invention, communication among the clients or between client and server occurs via a tunnel that allows transfer of authorized files and messages through firewalls and other network security mechanisms. A tunnel may be an intermediary program which acts as a relay between the sender and receiver. It accepts connections from its subscribers and the requests to those subscribers. The requests are stored for the corresponding subscribers. Once the subscribers obtain the requests and respond, the tunnel relays those responses to the corresponding requesters.

Figure 4:
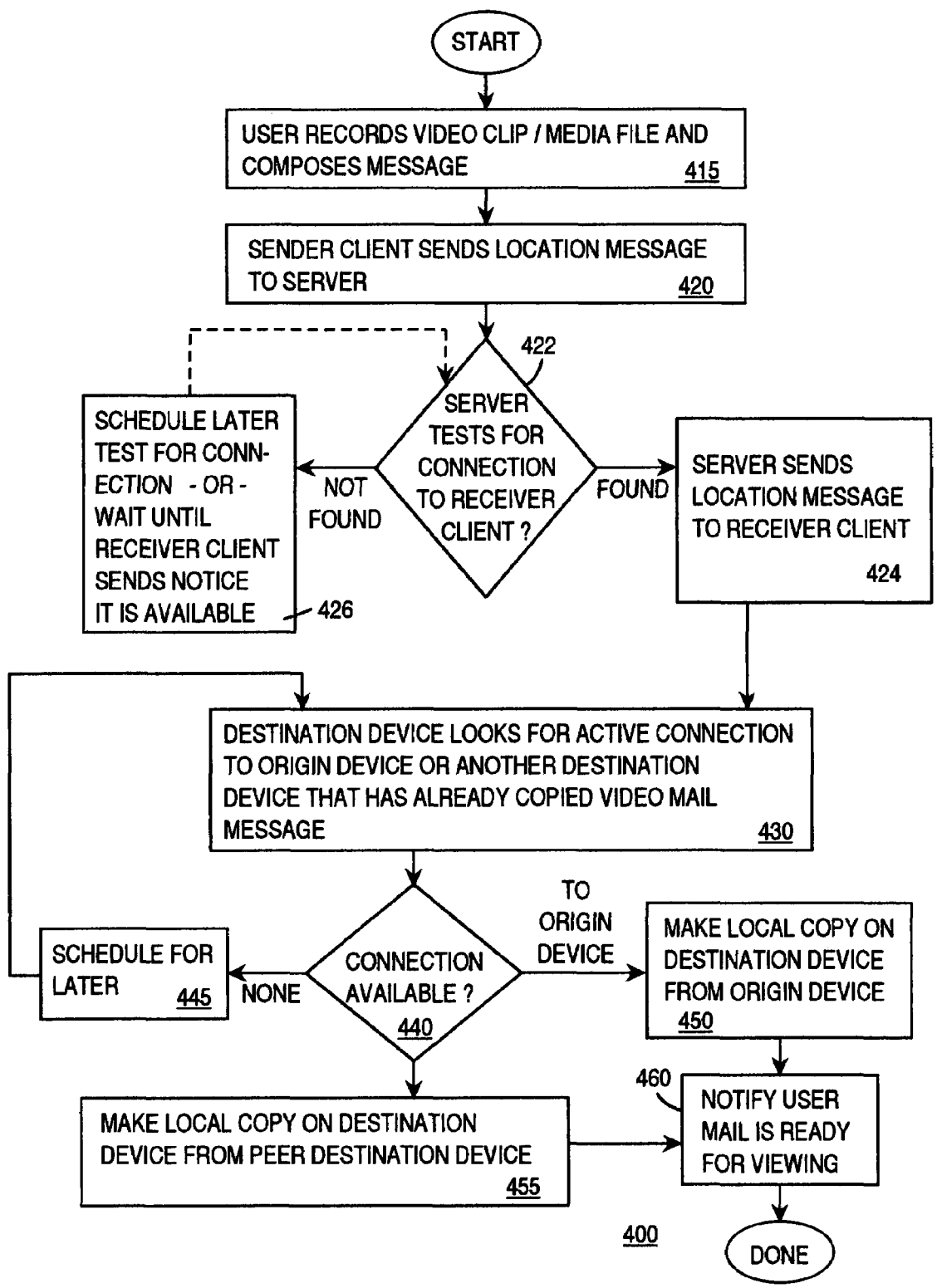
FIG. 4 is a flowchart of steps performed in accordance with one embodiment of the present invention for sending a location message and accessing a media file.

FIG. 4 is a flowchart of the process, according to one embodiment of the invention, of sending a location message. Although specific steps are disclosed in flowchart 400, such steps are exemplary. Process 400 includes steps that, in some embodiments of the invention, are carried out by processors and electrical components under the control of computer readable and computer executable instructions. The computer readable and computer executable instructions reside, for example, in data storage features including but not limited to volatile memory 504, non-volatile memory 506, volatile memory 604 and non-volatile memory 606 of FIGS. 5 and 6. The invention is well suited to performing various other steps or variations of the steps of FIG. 4. Within various embodiments of the invention, the steps of process 400 may be performed by software, by hardware, or by any combination of software and hardware.

In the embodiment of FIG. 4 specifically in step 415, a user records a media file (such as a video clip) and composes location message 200. Next in step 420, sender client 310 sends location message 200 to server 312.

Next in steps 422 to 426, server 312 forwards location message 200 to receiver client 314. In practice delays or complications may result in cases where a communication path between server 312 and receiver client 314 is only intermittently available or in which the addressing to reach receiver client 314 is dynamically assigned, such as by their Internet Service Providers (ISPs). In such cases, either the server can take the responsibility of polling to determine when receiver client 314 is available and ready to receive notifications of location messages, or receiver client 314 can take the responsibility of registering with server 312 when it is newly connected. In some embodiments of the invention, this registration process occurs using a video mail input output (VMIO) system.

In step 422, server 312 tests for the current availability of an active and available connection to receiver client 314. In the case where such a connection is found, step 424 occurs next in which server 312 sends location message 200 to receiver client 314. In the case where such a connection is not found, step 426 occurs next in which either server 312 waits a while and then polls by testing for the availability of such a connection, or receiver client 314 sends optional "I am on-line" message 330 to server 312, or both.

Next in step 430 of FIG. 4, receiver client 314 checks for the presence of an active connection to sender client 310. In the case where such a connection is available, step 440 passes control to step 450 in which media file(s) 230 is transferred from sender client 310 to receiver client 314 to make a local copy. It is understood that step 450 may be performed in a wide variety of ways in accordance with the present embodiment. For example, in order to accomplish step 450, the receiver client 314 may transfer to sender client 310 a request (e.g., 320) to send media file(s) 230. In response to the reception of request 320 at step 450, the sender client 310 sends a copy of media file(s) 230 to receiver client 314. Finally, in step 460 the recipient is notified that location message 200 along with its corresponding media file(s) 230 are ready for viewing.

In the case where, in step 430, a connection to sender client 310 is not currently available, then some embodiments of the invention check for the availability of a connection to another client that is a peer, e.g., that is another recipient of the location message 200 and that already has a copy of media file(s) 230. When such a connection is available, step 440 passes control to step 455 in which media file(s) 230 is transferred from that peer client to receiver client 314. It is appreciated that step 455 may be performed in a wide variety of ways in accordance with the present embodiment. For example, in order to accomplish step 455, the receiver client 314 may transfer to the peer client a request (e.g., 320) to send media file(s) 230. In response to the reception of request 320 at step 450, the peer client sends a copy of media file(s) 230 to receiver client 314. Finally, in step 460 the recipient is notified that location message 200 along with its corresponding media file(s) 230 are ready for viewing. In the case where, in step 430, no connection is currently available to a client with a copy of media file(s) 230, step 440 passes control to step 445 in which receiver client 314 schedules a later attempt to find a connection via which media file(s) 230 may be transferred.

In some embodiments of the invention, sender client 310 keeps track of which receiver clients have downloaded their local copy of media file(s) 230 and deletes or archives its copy of media file(s) 230 after all receivers have received media file(s) 230.

In some embodiments of the invention, a protocol is used to provide the addresses, and the same or a different protocol is used to notify the receiver client that the media file is available. Choices for these protocols include but are not limited to: video mail input output (VMIO) transfer and control protocols (customized Hypertext Transfer Protocol (HTTP) protocols), a protocol based Post Office Protocol 3 (POP3), and a protocol based on the Simple Mail Transfer Protocol (SMTP).

HTTP messages consist of requests and responses. Both messages use a generic message format and consist of a start-line, zero or more header fields, an empty line and possibly a message body. The request message includes, within the first line of that message, the method to be applied to the resource, the identifier of the resource and the protocol version in use.

Some embodiments of the invention extend the HTTP protocol by augmenting it with new methods, which apply to communications among the sender client, the receiver client and the server. These augmented methods include:

1) AUTHORIZATION. For the client to authenticate itself, some requests require the client to pass the authentication stage by using this method to login.

2) QUIT. For the client to close a connection and invalidate its authentication.

3) LIST. For the client to retrieve a list of pending messages from the server.

4) RETRIEVE. For the client to retrieve one or more message(s) from the server.

5) REMOVE. For the client to delete one or more message(s) from the server.

6) FINGER. For one client to check the on-line status and IP address of another client who subscribes to the presence service with the server.

7) SEND. For the client to send a message.

8) PIPE. For the client to check the requests directed to it held by a tunnel server.

The header fields and message body used with the augmented methods may depend on the method of the request. Both predefined header fields and augmented fields may be used. The first line of a response message may be the status line, consisting of the protocol version followed by a numeric status code and its associated textual phrase, with each element separated by space characters. Both predefined error codes and error values within the undefined error code space may be used, the latter with our augmented textual error messages.

FIG. 5 is a block diagram of an exemplary personal video recorder (PVR) 500 that may be used in accordance with one embodiment of the present invention. It is appreciated that some of the components of personal video recorder 500 are similar to the components of computer system 600 of FIG. 6, described herein. Other electronic devices and/or systems (e.g., set-top-box, computer, television Internet box, digital video recorder, and the like) may also function in a manner similar to personal video recorder 500 in accordance with the invention. Furthermore, any electronic device and/or system capable of encoding and/or decoding and/or transferring media content may be substituted for personal video recorder 500. Certain processes and steps are discussed herein that are realized, in one embodiment, as a series of instructions (e.g., software program) that reside within computer readable memory units of personal video recorder 500 and executed by a processor(s) of personal video recorder 500. When executed, the instructions cause personal video recorder 500 to perform specific actions and exhibit specific behavior which is described in detail herein.

Personal video recorder 500 of FIG. 5 comprises an address/data bus 510 for communicating information, one or more central processors 502 coupled with bus 510 for processing information and instructions. Central processor unit 502 may be a microprocessor or any other type of processor. The personal video recorder 500 also includes data storage features such as a volatile memory unit 504 (e.g., random access memory, static RAM, dynamic RAM, etc.) coupled with bus 510 for storing information and instructions for central processor(s) 502, a non-volatile memory unit 506 (e.g., read only memory, programmable ROM, flash memory, EPROM, EEPROM, etc.) coupled with bus 510 for storing static information and instructions for processor(s) 502. The personal video recorder 500 also includes one or more signal generating and receiving devices 508 coupled with bus 510 for enabling personal video recorder 500 to interface with other electronic devices. The communication interface(s) 508 of the present embodiment may include wired and/or wireless communication technology. For example, in one embodiment of the invention, the communication interface 508 is a serial communication port, but could also alternatively be any of a number of well known communication standards and protocols, e.g., USB, Ethernet, FireWire® (IEEE 1394), parallel, SCSI, Bluetooth® wireless communication, IR communication, broadband, and the like.

Additionally, the personal video recorder 500 of FIG. 5 can include an optional remote control device 516 (e.g., a universal remote control device having a number of buttons, dials, etc.) which is communicatively coupled to bus 510 for communicating user input information and command selections to the central processor(s) 502. It is appreciated that remote control device 516 may be implemented with the capability to communicate with personal video recorder 500 utilizing wireless communication (e.g., infrared signaling). The personal video recorder 500 can also include an optional mass data storage device 518 such as a magnetic or optical disk and disk drive (e.g., hard drive or floppy diskette) coupled with bus 510 for storing information and instructions. An optional display device 512 is coupled to bus 510 of personal video recorder 500 for displaying video and/or graphics. It is understood that optional display device 512 may be a cathode ray tube (CRT), flat panel liquid crystal display (LCD), field emission display (FED), or any other display device suitable for displaying video and/or graphic images and alphanumeric characters recognizable to a user.

FIG. 6 is a block diagram of an exemplary computer system 600 that can be used in accordance with one embodiment of the invention. It should be appreciated that system 600 is not strictly limited to be a computer system; rather system 600 may be any type of computing device (e.g., server computer, portable computing device, etc.). Certain processes and steps are discussed herein that are realized, in one embodiment, as a series of instructions (e.g., software program) that reside within computer readable memory units of computer system 600 and executed by a processor(s) of system 600. When executed, the instructions cause computer 600 to perform specific actions and exhibit specific behavior which is described in detail herein.

Computer system 600 of FIG. 6 comprises an address/data bus 610 for communicating information, one or more central processors 602 coupled with bus 610 for processing information and instructions. Central processor unit 602 may be a microprocessor or any other type of processor. The computer 600 also includes data storage features such as a volatile memory unit 604 (e.g., random access memory, static RAM, dynamic RAM, etc.) coupled with bus 610 for storing information and instructions for central processor(s) 602, a non-volatile memory unit 606 (e.g., read only memory, programmable ROM, flash memory, EPROM, EEPROM, etc.) coupled with bus 610 for storing static information and instructions for processor(s) 602. System 600 also includes one or more signal generating and receiving device 608 coupled with bus 610 for enabling system 600 to interface with other electronic devices. The communication interface(s) 608 of the present embodiment may include wired and/or wireless communication technology. For example, in one embodiment of the invention, the communication interface 608 is a serial communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, broadband, and the like.

Optionally, computer system 600 can include an alphanumeric input device 614 including alphanumeric and function keys coupled to the bus 610 for communicating information and command selections to the central processor(s) 602. The computer 600 can include an optional cursor control or cursor directing device 616 coupled to the bus 610 for communicating user input information and command selections to the central processor(s) 602. The cursor directing device 616 can be implemented using a number of well known devices such as a mouse, a track ball, a track pad, an optical tracking device, a touch screen, etc. Alternatively, it is appreciated that a cursor can be directed and/or activated via input from alphanumeric input device 614 using special keys and key sequence commands or by other means such as, for example, voice commands. The system 600 can also include an optional mass data storage device 618 such as a magnetic or optical disk and disk drive (e.g., hard drive or floppy diskette) coupled with bus 610 for storing information and instructions. An optional display device 612 is coupled to bus 610 of system 600 for displaying video and/or graphics. It should be appreciated that optional display device 612 may be a cathode ray tube (CRT), flat panel liquid crystal display (LCD), field emission display (FED), or any other display device suitable for displaying video and/or graphic images and alphanumeric characters recognizable to a user.

Accordingly, the invention provides a method and system which enables delivering location messages via a peer-to-peer connection—one that does not place, even temporarily, a copy of the media file on an intermediate server. However, it should be appreciated that under certain situations (e.g., when a tunnel is used in a peer-to-peer file transfer), a portion of the media file may be cached on an intermediate server by an embodiment of the present invention.

The foregoing descriptions of specific embodiments of the invention have been presented for purposes of illustration and description. They are not intended to be exhaustive or to limit the invention to the precise forms disclosed, and obviously many modifications and variations are possible in light of the teachings herein. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system comprising:
a sender client configured to send a location message comprising a recipient address, a handle to a video file and a preview of the video file, wherein the location message is sent without the video file, and wherein further the video file comprises a plurality of still frames that represent a scene in motion;
a digital video recorder; and
a server configured to receive the location message from the sender client and to send the location message to the digital video recorder that corresponds with the recipient address;
wherein the digital video recorder is configured to receive the location message from the server and to access the video file from the sender client.

2. The system of claim 1, wherein the sender client is selected from a personal video recorder, a personal computer, a workstation, a video camcorder and a personal digital assistant.

3. The system of claim 1, wherein the server is selected from a personal video recorder, a personal computer, a workstation, an application service provider and a remote server accessed via an internet.

4. The system of claim 1, wherein the location message further comprises information selected from a title of the video file, a copyright indication of the video file, a date stamp of the video file, a time stamp of the video file and at least one text field.

5. The system of claim 1 wherein the recipient address is of a type selected from a user identifier (ID) on said server, an Internet domain name of said server, an Internet Protocol (IP) address, an e-mail address, a user identifier (ID) on a local network, a client identifier (ID) on a local network and a client address on a bus.

6. The system of claim 1 wherein at least a portion of the video file is stored and transferred in a format selected from a format compatible with one of the Motion Picture Expert Group (MPEG) standards, MPEG-2, and MP3.

7. The system of claim 1, wherein:
the sender client is further configured to use a protocol to send the location message to the server; and
the server is further configured to use the protocol to receive the location message;
wherein the protocol is selected from video mail input output (VMIO) transfer and control protocols, a protocol based Post Office Protocol 3 (POP3), a protocol based on a Simple Mail Transfer Protocol (SMTP), and a protocol based on a Hypertext Transfer Protocol (HTTP).

8. The system of claim 1, wherein:
the server is further configured to use a protocol to send the location message to the digital video recorder; and
the digital video recorder is further configured to use the protocol to receive the location message; and
the protocol is selected from video mail input output (VMIO) transfer and control protocols, a protocol based Post Office Protocol 3 (POP3), a protocol based on a Simple Mail Transfer Protocol (SMTP), and a protocol based on a Hypertext Transfer Protocol (HTTP).

9. The system of claim 1, wherein the server is further configured to check for a connection to the digital video recorder, and to send the location message when the check finds that the connection is active.

10. The system of claim 1, wherein:
the digital video recorder is further configured to notify the server when the receiver client is available to receive the location message; and
the server is further configured to send the location message in response to the server receiving the notification that the digital video recorder is available.

11. The system of claim 1, wherein:
the digital video recorder is further configured to, upon receipt of the location message, to check for a connection to the sender client on which to receive the video file.

12. The system of claim 1, further comprising:
a connection from the sender client to the digital video recorder upon which the transfer of the video file occurs, the connection being selected from an Internet-based connection, a connection based on a Transmission Control Protocol/Internet Protocol (TCP/IP) and a connection based on a User Datagram Protocol (UDP).

13. The system of claim 1, further comprising:
a connection from the sender client to the server upon which the location message is transferred, the connection being selected from an Internet-based connection, a connection based on a Transmission Control Protocol/Internet Protocol (TCP/IP) and a connection based on a User Datagram Protocol (UDP).

14. The system of claim 10, further comprising:
a connection from the digital video recorder to the server upon which the notification is transferred, the connection being selected from an Internet-based connection, a connection based on a Transmission Control Protocol/Internet Protocol (TCP/IP) and a connection based on a User Datagram Protocol (UDP).

15. A system comprising:
a sender client coupled to send a location message comprising a recipient address, a handle to a media file and a preview of the media file;
a digital video recorder; and
a server coupled to receive the location message from the sender client and for sending the location message to the digital video recorder that corresponds with the recipient address;
wherein the digital video recorder is coupled to receive the location message from the server and to access the media file from a peer digital video recorder.

16. The system of claim 15, wherein the sender client is selected from a personal video recorder, a personal computer, a workstation, a video camcorder and a personal digital assistant.

17. The system of claim 15, wherein the server is selected from a personal video recorder, a personal computer, a workstation, an application service provider and a remote server accessed via an internet.

18. The system of claim 15, wherein the location message further comprises information selected from a date stamp of the media file, a time stamp of the media file, a copyright indication for the media file and at least one text field.

19. The system of claim 15 wherein the recipient address is of a type selected from a user identifier (ID) on said server, an Internet domain name of said server, an Internet Protocol (IP) address, an e-mail address, a user identifier (ID) on a local network a client identifier (ID) on a local network and a client address on a bus.

20. The system of claim 15 wherein the media file is stored and transferred in a format selected from a format compatible with one of the Motion Picture Expert Group (MPEG) standards, MPEG-2, and MP3.

21. The system of claim 15, wherein:
the sender client is further configured to use a protocol to send the location message to the server; and
the server is further a configured to receive the location message according to the protocol;
wherein the protocol is selected from video mail input output (VMIO) transfer and control protocols, a protocol based Post Office Protocol 3 (POP3), a protocol based on a Simple Mail Transfer Protocol (SMTP), and a protocol based on a Hypertext Transfer Protocol (HTTP).

22. The system of claim 15, wherein:
the server is further configured to use a protocol for sending the location message to the digital video recorder;
the digital video recorder is further configured to use the protocol to receive the location message; and
the protocol is selected from video mail input output (VMIO) transfer and control protocols, a protocol based Post Office Protocol 3 (POP3), a protocol based on a Simple Mail Transfer Protocol (SMTP), and a protocol based on a Hypertext Transfer Protocol (HTTP).

23. The system of claim 15, wherein the server is further configured to check for a connection to the digital video recorder, and to send the location message when the check finds that the connection is active.

24. The system of claim 15, wherein:
the digital video recorder is further configured to notify the server when the digital video recorder is available to receive the location message.

25. The system of claim 24, wherein:
the server is further configured to send the location message in response to the server receiving the notification that the digital video recorder is available.

26. The system of claim 15, further comprising:
a connection from the peer digital video recorder to the personal video recorder upon which the transfer of the media file occurs, the connection being selected from selected from an Internet-based connection, a connection based on a Transmission Control Protocol/Internet Protocol (TCP/IP) and a connection based on a User Datagram Protocol (UDP).

27. The system of claim 15, further comprising:
a connection from the sender client to the server upon which the location message is transferred, the connection being selected from an Internet-based connection, a connection based on a Transmission Control Protocol/Internet Protocol (TCP/IP) and a connection based on a User Datagram Protocol (UDP).

28. The system of claim 24, further comprising:
a connection from the digital video recorder to the server upon which the notification is transferred, the connection being selected from an Internet-based communication, a communication based on a Transmission Control Protocol/Internet Protocol (TCP/IP) and a communication channel based on a User Datagram Protocol (UDP).

29. A method comprising:
sending a location message from a sender client to a server, the location message comprising a recipient address, a handle for a media file, and a preview of the media file, wherein the location message is sent without the media file;
sending the location message from the server to a digital video recorder that corresponds with the recipient address;
checking, upon receipt of the location message at the digital video recorder, for a connection from the digital video recorder to the sender client on which to access the media file;
if none is found, checking for a connection to a peer digital video recorder on which to access the media file; and
accessing the media file from a source selected from the sender client and the peer digital video record.

30. The method of claim 29, wherein the sender client is selected from a personal video recorder, a personal computer, a workstation, a video camcorder and a personal digital assistant.

31. The method of claim 29, wherein the server selected from a personal video recorder, a personal computer, a workstation, an application service provider and a remote server accessed via the Internet.

32. The method of claim 29, wherein the location message further comprises information selected from a title of the media file, a date stamp of the media file, a time stamp of the media file and at least one text field.

33. The method of claim 29 wherein the recipient address is of a type selected from a user identifier (ID) on said server, an Internet domain name of said server, an Internet Protocol (IP) address, an e-mail address, a user identifier (ID) on a local network a client identifier (ID) on a local network and a client address on a bus.

34. The method of claim 29 wherein the media file is stored and transferred in a format selected from a format compatible with one of the Motion Picture Expert Group (MPEG) standards, MPEG-2, and MP3.

35. The method of claim 29, further comprising:
using a protocol to provide the location message, the protocol is selected from video mail input output (VMIO) transfer and control protocols, a protocol based Post Office Protocol 3 (POP3), a protocol based on a Simple Mail Transfer Protocol (SMTP), and a protocol based on a Hypertext Transfer Protocol (HTTP).

36. The method of claim 29, further comprising:
checking for a connection to the digital video recorder; and
sending the location message when the checking finds that the connection is active.

37. The method of claim 29, further comprising:
notifying the server when the digital video recorder is able to receive the location message.

38. The method of claim 37, further comprising:
sending the location message in response to receiving the notification.

39. The method of claim 29, further comprising:
accessing the media file from the sender client via a method selected from an Internet-based communication method, a communication method based on a Hypertext Transfer Protocol (HTTP) or File Transfer Protocol (FTP).

40. The method of claim 29, further comprising:
delivering the location message via a method selected from an Internet-based communication method, a communication method based on a Transmission Control Protocol/Internet Protocol (TCP/IP) and a communication method based on a User Datagram Protocol (UDP).

* * * * *